United States Patent [19]

McLellan

[11] 4,412,333
[45] Oct. 25, 1983

[54] THREE-ELECTRODE LOW PRESSURE DISCHARGE APPARATUS AND METHOD FOR UNIFORM IONIZATION OF GASEOUS MEDIA

[76] Inventor: Edward J. McLellan, 422 Connie Ave., Los Alamos, N. Mex. 87544

[21] Appl. No.: 198,028

[22] Filed: Oct. 17, 1980

[51] Int. Cl.³ .............................................. H01S 3/097
[52] U.S. Cl. ....................................... 372/87; 372/86; 372/58
[58] Field of Search ...................... 372/87, 88; 378/58, 378/82, 86

[56] References Cited

PUBLICATIONS

"Double Discharge Excitation for Atmospheric Pressure $CO_2$ Lasers", LaFlamme; Rev. Sci. Inst. 41, 1578, (1970).
"A 300-J Moltigigawatt $CO_2$ Laser", Richardson et al., IEEE J. of Quant. Electron 9, 236, (1973).
"Effect of a Third Electrode on a Low-Voltage Arc", Kaibyshev et al.; Sov. Phys. Tech. Phys., vol. 20, No. 2.

Primary Examiner—James W. Davie
Assistant Examiner—Leon Scott, Jr.

[57] ABSTRACT

Uniform, transverse electrical discharges are produced in gaseous media without the necessity of switching the main discharge voltage with an external device which carries the entire discharge current. A three-electrode low pressure discharge tube is charged across its anode (1) and cathode (2) to below breakdown voltage using a dc voltage source (3). An array of resistors (4) or capacitors can be made to discharge to the wire screen anode by means of a low energy high voltage pulse circuit (5) producing sufficient preionization in the region between the anode and cathode to initiate and control the main discharge. The invention has been demonstrated to be useful as a $CO_2$ laser oscillator and pulse-smoother. It can be reliably operated in the sealed-off mode.

10 Claims, 2 Drawing Figures

THREE-ELECTRODE LOW PRESSURE DISCHARGE APPARATUS AND METHOD FOR UNIFORM IONIZATION OF GASEOUS MEDIA

The present invention relates generally to uniform ionization of gaseous media useful in pulsed gas lasers and more particularly to a three electrode, high gain low pressure $CO_2$ laser which allows the use of dc voltage across the electrodes surrounding the gain medium, thereby eliminating the need for a costly and less reliable pulsed discharge system for its excitation. This invention is the result of a contract with the Department of Energy (Contract No. W-7405-ENG-36).

BACKGROUND OF THE INVENTION

Three-electrode atmospheric pressure lasers have been amply described in the literature. However, the reported configurations have proved unsatisfactory for low pressure operation. The apparatus of the instant invention is a three-electrode low pressure gas discharge tube and electronics which can be used as a laser. A discharge between an array of resistors and a highly transparent metal screen anode provides preionization of the gases employed. This causes a glow discharge to occur in the region between the anode and cathode to which is applied an unswitched dc voltage well below the breakdown potential of the entire system. When the ion buildup is sufficient, the much higher energy applied between the anode and cathode surrounding the medium in which uniform ionization is desired discharges allowing the electrical energy to be uniformly distributed in the gas. Thus, a relatively low energy preionization discharge pulse effectively initiates and controls a significantly greater energy discharge. The present invention has utility for the operation of laser amplifiers and oscillators at high repetition rates because it reduces the requirements for high voltage switch energy handling capacity, one of the technologically weak and expensive areas of laser electronics. In other words, the electronic components needed to control the plasma discharge are greatly simplified from those of the existing art. Further, it has been demonstrated that the uniform discharge characteristics occur over a wide range of laser gas mixtures when the apparatus of the instant invention is operated as a $CO_2$ laser. In particular, stable laser action has been found for carbon dioxide-air mixtures. This remarkable result permits sealed-off operation as a $CO_2$ laser because the discharge characteristics are unaffected by the presence of oxygen, the most important cause of unreliable operation of such devices.

A good summary of prior technology can be found in two journal articles, both describing double discharge $CO_2$ devices using three electrodes.

1. In "Double Discharge Excitation for Atmospheric Pressure $CO_2$ Lasers" by Albert K. LaFlamme, Rev. Sci. Instr. 41, 1578 (1970), a modified double discharge laser is discussed. By this it is meant that a single trigger device controls both the preionization and the gain medium pumping discharges. The apparatus of the instant invention also relies on one controlling voltage switch. However, and this is the critical feature of my invention, the trigger unit in our device controls only the preionization discharge. It does not have to carry any of the substantial laser discharge current that is carried by LaFlamme's trigger device. This results in substantial improvement in laser cost, reliability and pulse repetition rate.

2. In "A 300-J Multigigawatt $CO_2$ Laser" by Martin C. Richardson, A. J. Alcock, Kurt Leopold, and Peter Burtyn, IEEE J. Quantum Electron. 9, 236 (1973), a true double discharge laser is described. A first trigger device fires the preionization discharge, while a second such device presents the main discharge until sufficient ionization has occurred in the region of anode. Here, as in Ref. 1, one trigger unit is carrying the entire discharge current. As described above, such devices are expensive, have a tendency to be unreliable and have limited rates of repetition.

The apparatus of the instant invention then, provides the uniform discharge characteristics desirable for laser oscillators and amplifiers without the use of a trigger device which "holds off" the main discharge until sufficient ionization occurs, making it an improvement, especially at lower pressures, over existing art which teaches the use of such above described triggering devices for a wide range of pressures. See e.g., Ref. 1, p. 1584. Another advantage is that the mai discharge electrodes can be charged to lower voltages than in Refs. 1 and 2 since the very uniform preionization of the instant invention permits the high energy discharge to occur at these lower voltages.

SUMMARY OF THE INVENTION

An object of the apparatus of the instant invention is to provide uniform ionization of gaseous media.

Another object of our invention is to provide a source of pulsed, uniform laser amplification or oscillation at high repetition rates with greatly simplified electronics and at lower charging voltages.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the apparatus of this invention includes a rectangular wire mesh anode and an approximately coextensive solid metal cathode arranged to be parallel and spaced apart forming two sides of a first discharge volume; a planar, rectangular, close-packed array of two lead impedance elements parallel to, and approximately coextensive with, located apart from, and on the opposite side of, the anode from the cathode forming two sides of a second volume and having all of the electrical leads on the side of the array away from the anode connected to a common bus and all of the electrical leads on the opposite side formed into leads cut to approximately the same length and disposed substantially perpendicularly to and pointing toward the anode; a vacuum tight enclosure which contains the gaseous medium and supports the electrodes and the impedance element array; means for filling and removing gaseous media from the enclosure; a low energy, high voltage pulse source attached to the common bus for causing a uniform pulsed ionizing discharge in the second volume which discharges extends past the anode some distance into the first volume; and a high energy, high voltage source for impressing and restoring a potential difference between the electrodes below the breakdown voltage of the gaseous medium in the first volume which potential difference supports a transient uniform discharge when the breakdown voltage of the first volume is reduced as a result of the uniform preionizing discharge extending out of the second volume some distance into the first volume.

In a further aspect of the present invention, in accordance with its objects and purposes, the gaseous medium is chosen such that the breakdown in the first volume produces a population inversion in the gases undergoing discharge and product gases resulting therefrom suitable for laser action therein. Preferably, windows are mounted on the enclosure through which light can traverse the first volume without obstruction and through which laser oscillation can be supported at wavelengths characteristic of the resulting population inversion in the gases undergoing discharge and product gases therefrom.

In yet a further aspect of the present invention, in accordance with its objects and purposes, the method includes filling the region between a pair of spaced apart electrodes with a gaseous medium, charging the electrodes to a dc voltage which is below the breakdown voltage of the electrodes for the particular gaseous medium and pressure employed yet high enough to form and maintain a high energy pulsed discharge across the electrodes when sufficient ionization exists between the pair of electrodes, and causing uniform ionization in the region between the spaced apart electrodes thereby initiating and controlling the discharge between the spaced apart electrodes by reducing the breakdown voltage of the gaseous medium which results in a uniform discharge therebetween without the necessity of using a switch to control the discharge.

The benefits and advantages achieved by the apparatus of the instant invention include the simplification of the electronics needed to uniformly drive a plasma discharge required to provide laser oscillation or amplification, the elimination of costly, slow and failure-prone high voltage switching devices, and the ability to use lower and dc voltages across the main discharge electrodes, effectuating considerably safer laser operation.

BRIEF DESCRIPTION OF THE DRAWINGS

The accompanying drawings which are incorporated in and form a part of the specification, illustrate an embodiment of the present invention and, together with the description, serve to explain the principles of the invention. In the drawings.

DETAILED DESCRIPTION OF A PREFERRED EMBODIMENT OF THE INVENTION

Reference will now be made in detail to the present preferred embodiment of the invention, an example of which is illustrated in the accompanying drawings. The apparatus of the instant invention is shown in FIGS. 1 and 2.

Figure 1:
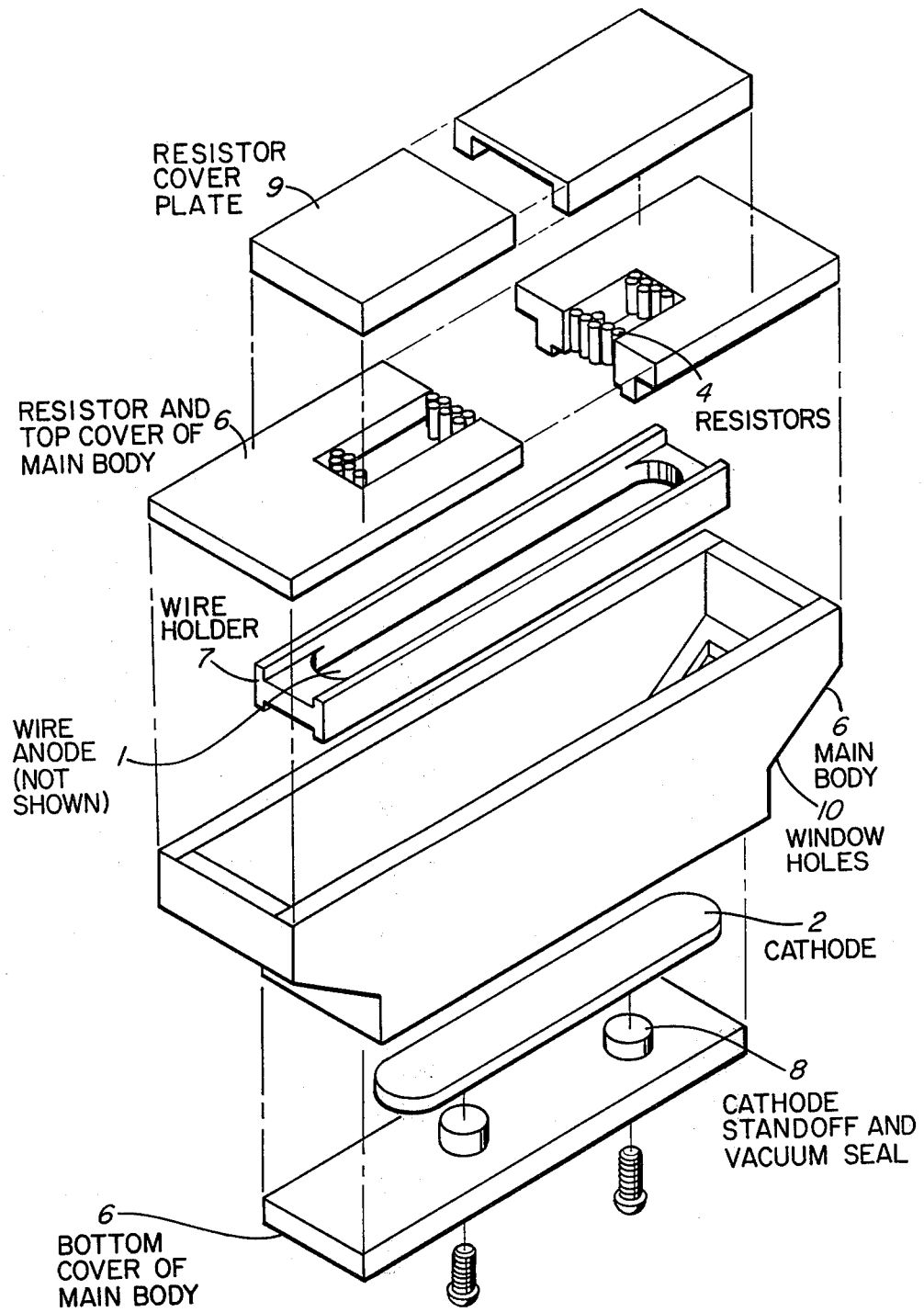
FIG. 1 is an assembly diagram of the low pressure discharge tube.

FIG. 1 shows the assembly configuration of the various components of the low pressure discharge tube. The instant apparatus uses for preionization a fast discharge between a hexagonal close pack array of 1 k$\Omega$ 1-watt resistors 4 and a screen anode made up of parallel stainless wires 1. Capacitors can be substituted for the resistors for more efficient energy use since the current delivered to the preionization discharge is limited by the impedance of the entire system. The screen wires 1 have a diameter of about 0.025 cm and are spaced about 0.078 cm apart producing a screen of about 68% transparency. They are strung on the side of the electrode holder 7 toward the lasing medium. The laser cathode 2 is constructed from a copper-plated brass bar with semi-circular contoured ends and edges. It is typically 3 cm wide for $CO_2$ laser operation. The dimensions of the active laser volume are about $3\times3\times35$ cm. That is, this is the actual main discharge volume within which the laser gain medium is uniformly stimulated. The electrode assembly is enclosed in a vacuum tight body 6 to which windows 10 can be attached and gases can be introduced and evacuated. Spacing between the resistors and anode, and anode and cathode are typically about 1 cm and 3 cm, respectively, for the $CO_2$ gas mixtures. Other gas mixtures might require different spacings for optimum performance of the instant invention. The cathode 2 is attached to the body 6 by means of a combination standoff and vacuum seal 8. The discharge apparatus can be used in two optical configurations which are not illustrated by the figures. For example, for a simple $CO_2$ laser oscillator, the discharge apparatus, filled with a gas mixture which contains $CO_2$, would be placed inside of an optical cavity with passive elements at either end. A totally reflecting concave mirror could be located at one end, and a partially reflecting output coupler at the other. Appropriate beam limiting apertures might be added. For use as a longitudinal mode pulse smoother or as an amplifier, the tube would be located in an optical cavity with both passive and active components. The gain tube of a TEA laser for which the output is to be amplified or smoothed would be placed in tandem with the discharge tube of the instant invention, the two devices being inside, say, an optical cavity comprised of a totally reflecting concave mirror, a partially reflecting output coupler, and appropriate apertures. The firing timing of the two discharge tubes would be adjusted according to whether smoothing or amplification was desired.

Figure 2:
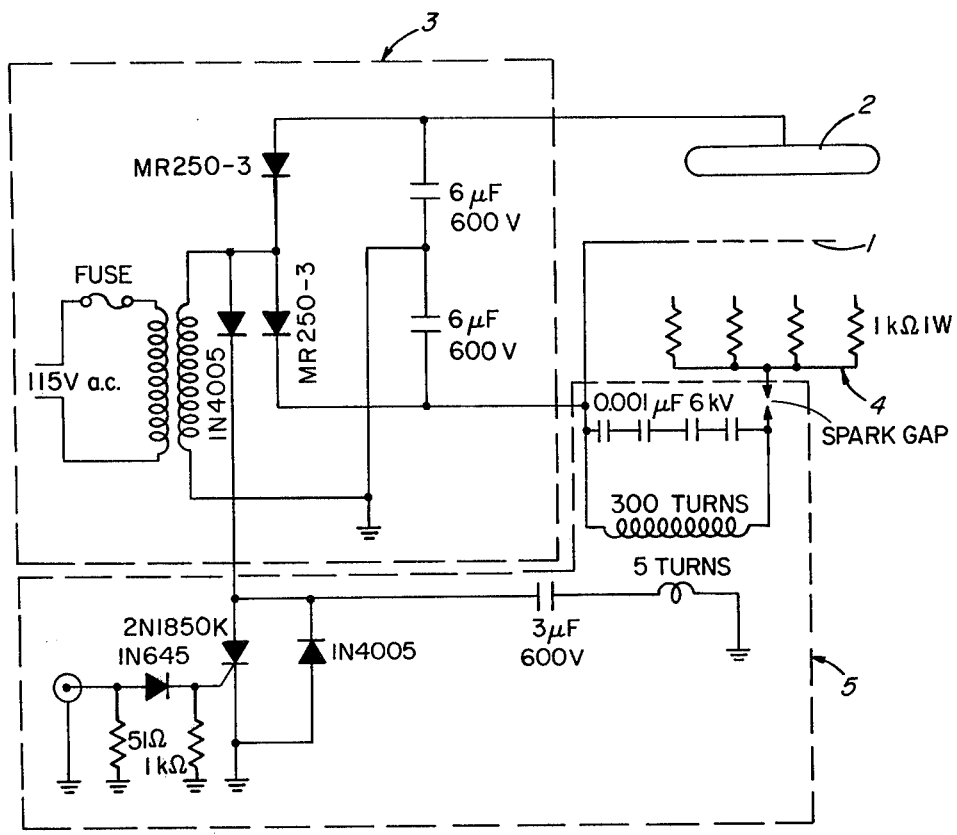
FIG. 2 is a schematic of the electrical circuit used to initiate and drive the discharge.

FIG. 2 shows the electrical circuitry of eh apparatus of the present invention. The main discharge which produces the optical gain is operated using an unswitched dc voltage which is well below the breakdown potential of the apparatus. One lead of each resistor 4 on the side away from the anode is brought into electrical connection with a bus which is attached to the low energy, fast risetime pulse generator 5, while the other lead of each resistor is left unattached and disposed substantially perpendicularly to and pointing toward the wire anode 1. The application of a low energy, fast risetime, approximately 20 kV pulse to the array of resistors causes a glow discharge to occur in the laser region between the screen anode and the solid, profiled cathode. When sufficient ionization occurs, the main discharge ensues at dc voltages far below that which would normally be required. Moreover, laser action occurs over the entire discharge region because of the exceptional uniformity of the discharge. This allows a minimum volume to be pumped thereby improving efficiency. It was found that the spark gap in the trigger circuitry was not necessary in most applications for which the instant invention was used.

The small signal gain on the 10.6 μm P (20) line of $CO_2$ was measured using 1:1:3, 1:1:8 and 1:1:15 mixtures of $CO_2$, $N_2$ and He as the energy loading was varied between 40 and 200 J/liter.atm and the E/N was varied between $0.085 \times 10^{-17}$ and $1.1 \times 10^{-15}$ V.cm$^2$. The peak gain exceeded 5.0 m$^{-1}$. Two discharge tubes with 35 cm long electrodes were arranged in tandem in a single laser resonator. The output energy was measured as a function of pressure, energy loading, and laser output coupler reflectivity for the 1:1:8 mix. A maximum output energy of more than 0.5 J was observed at a pressure of 40 torr with an output mirror reflectivity of about 50%. The energy deposited in the pumped volume of the laser gas under these conditions was 9.24 J from both preionizer and the main discharge. This yields an efficiency of almost 6%. Scaling to higher output energy was found to be quite easy to effectuate. Operating pressures were restricted to below about 20 torr with $CO_2$ and $N_2$ mixtures in the absence of He, and to below about 80 torr with He present.

It was further found that the apparatus of the instant invention would reproducibly and stably operate as a carbon dioxide laser when mixtures of only $CO_2$ and room air were used as the gain medium. That is, there is no oxygen-free limitation to laser action. This immediately suggests the use of the instant invention in a sealed-off mode. In other words, there is no longer a requirement of flowing an oxygen-free gas mixture through the discharge tube to prevent oxygen buildup after sustained operation. Oxygen in quite low concentrations has been known to render $CO_2$ lasers described in the literature effectively inoperative, so that freedom from an oxygen-free limitation on the gas mixtures represents a substantial improvement in carbon dioxide laser technology.

In summary, the apparatus of the instant invention is a pulsed, three-electron low pressure discharge tube which is operated at an unswitched dc voltage well below the breakdown potential of the apparatus. The application of a low energy, fast risetime high voltage pulse to a preionization electrode and its subsequent discharge to the anode provides sufficient ionization to trigger the unswitched dc voltage giving time to uniform electrical pumping of a gaseous medium. The low energy preionization discharge then, switches and controls a much larger energy discharge. The fact that a high voltage switching device which must carry the entire main discharge current is no longer necessary gives rise to the novel features and advantages of the instant invention. Moreover, the freedom from deleterious oxygen impurity effects on the quality of the discharge allows the device to be operated in the sealed-off mode which greatly improves the portability and flexibility of the invention when operated as a $CO_2$ laser.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principals of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for uniformly ionizing a gaseous medium and substantially uniformly depositing substantial energy therein which comprises in combination:
   (a) a pair of rectangular electrodes including a metal cathode and a wire screen anode, said anode being spaced apart from, approximately coextensive with, and disposed in a substantially parallel manner to said cathode and forming a first volume therebetween enclosed on two sides by said pair of rectangular electrodes into which the gaseous medium can freely travel;
   (b) a close-packed array of high voltage impedance elements disposed in a planar configuration, said array being spaced apart from, approximately coextensive with, and located in a substantially parallel manner to said anode on the opposite side thereof from said cathode and with said anode forming a second volume therebetween into which the gaseous medium can freely travel, said second volume being enclosed on two sides by said anode and said array, each of said impedance elements in said array thereof including a first electrical lead and a second electrical lead, all of said first electrical leads being unconnected, approximately of equal length and disposed in a manner substantially perpendicular to said planar configuration and pointing toward and spaced apart from said anode, and all of said second leads being brought into electrical contact forming an electrical bus thereby said bus being disposed on said array in a direction away from said anode:
   (c) means for producing a low energy, high voltage pulse between said bus and said anode thereby forming a first electric discharge in the gaseous medium present in said second volume, said first electric discharge producing a uniform ionization of the gaseous medium in said second volume which extends into said first volume through said anode in a manner sufficient to produce substantial uniform ionization of the gaseous medium therein;
   (d) means for producing a high dc potential difference between said pair of electrodes said potential difference being below the breakdown limit of the gaseous medium in said first volume, said potential difference producing means being capable of delivering substantial energy to a second electric discharge occurring between said pair of electrodes said second electric discharge being initiated and controlled solely by said substantial uniform ionization of the gaseous medium in said first volume, said second electric discharge depositing substantial energy in the gaseous medium; and
   (e) a gas impermeable enclosure for containing and supporting said pair of electrodes and said array of impedance elements, and containing the gaseous medium.

2. The apparatus of claim 1, wherein said gas impermeable enclosure includes means for permitting gaseous medium filling and evacuating thereof.

3. The apparatus according to claim 2, wherein said impedance elements include resistors.

4. The apparatus according to claim 3, wherein said wire grid anode is comprised of about 0.025 cm dia. wires parallel and spaced about 0.078 cm apart, and having a 68% grid transparency.

5. The apparatus according to claim 4, wherein said cathode is comprised of a copper-plated brass bar about 3 cm in width with semicircular contoured ends and edges.

6. The apparatus according to claim 5, wherein each of said resistors in said array thereof has about 1 k Ω resistance.

7. The apparatus according to claim 6, wherein said anode to cathode spacing is about 3 cm, and said first electrical lead to anode spacing is about 1 cm.

8. The apparatus according to claim 2, wherein said impedance elements include capacitors.

9. The apparatus according to claim 2, wherein said impedance elements include inductors.

10. A method for producing a uniform high energy discharge in a gaseous medium between a pair of spaced apart electrodes, which comprises the steps of:
(a) filling the region between the pair of spaced apart electrodes with the gaseous medium;
(b) charging the pair of electrodes to a dc voltage which is below the breakdown voltage of the gaseous medium yet high enough to form a high energy pulsed discharge when sufficient ionization exists between the pair of spaced apart charged electrodes, said high energy pulsed discharge depositing substantial energy in the gaseous medium between the pair of spaced apart charged electrodes; and
(c) causing sufficient uniform ionization in the region between the pair of spaced apart charged electrodes such that solely said uniform ionization initiates and controls said high energy pulsed discharge between said pair of spaced apart charged electrodes by reducing the breakdown voltage of the gaseous medium therebetween thereby causing the uniform high energy discharge between the pair of spaced apart electrodes.

* * * * *